(12) United States Patent
Guo et al.

(10) Patent No.: US 6,922,884 B2
(45) Date of Patent: Aug. 2, 2005

(54) METHOD FOR PREVENTING MAGNETIC DAMAGE TO A GMR HEAD DURING BACK-END PROCESSING

(75) Inventors: Yimin Guo, San Jose, CA (US); Li-Yan Zhu, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 60 days.

(21) Appl. No.: 10/394,084

(22) Filed: Mar. 21, 2003

(65) Prior Publication Data

US 2004/0182479 A1 Sep. 23, 2004

(51) Int. Cl.[7] .......................... G11B 5/127; H04R 31/00
(52) U.S. Cl. ............... 29/603.1; 29/603.09; 29/603.12; 360/324.1; 360/324.11; 360/324.12
(58) Field of Search ............................. 29/603.09, 603, 29/603.12; 360/324.1, 324, 324.12, 324.11

(56) References Cited

U.S. PATENT DOCUMENTS

| | | | | |
|---|---|---|---|---|
| 5,465,185 A | * | 11/1995 | Heim et al. | 360/324.11 |
| 5,974,657 A | * | 11/1999 | Fox et al. | 29/603.08 |
| 6,146,813 A | | 11/2000 | Girard et al. | 430/319 |
| 6,230,389 B1 | | 5/2001 | Zhu | 29/603.1 |
| 6,262,869 B1 | * | 7/2001 | Lin et al. | 360/324.11 |
| 6,374,479 B1 | | 4/2002 | Sasaki et al. | 29/603.16 |
| 6,415,500 B1 | | 7/2002 | Han et al. | 29/603.14 |
| 6,473,279 B2 | * | 10/2002 | Smith et al. | 360/324.12 |

FOREIGN PATENT DOCUMENTS

JP           08203033 A     *  8/1996  ............ G11B/5/39

OTHER PUBLICATIONS

"High frequency permeability measurements on Ni76Fe10Co14/Cu giant magnetoresistive multilayers"; Doyle, W.D.; Fujiwara, H.; Hossain, S.; Matsuzono, A.; Parker, M.R.; Magnetics, IEEE Transactions on, vol.: 30, Issue 6, Nov. 1994; pp.: 382–3830.*

* cited by examiner

*Primary Examiner*—Paul D Kim
(74) *Attorney, Agent, or Firm*—George D. Saile; Stephen B. Ackerman

(57) ABSTRACT

A method is provided for preserving the transverse biasing of a GMR (or MR) read head during back-end processing. In a first preferred embodiment, the method comprises magnetizing the longitudinal biasing layers of the read head in a transverse direction, so that the resulting field at the position of the transverse biasing layer places it in a minimum of potential energy which stabilizes its direction. The field of the longitudinal biasing layer is then reset to the longitudinal direction in a manner which maintains the transverse biasing direction. In a second embodiment, a novel fixture for mounting the read head during processing includes a magnetic portion which stabilizes the transverse bias of the read head. The two methods may be used singly or in combination.

10 Claims, 2 Drawing Sheets

METHOD FOR PREVENTING MAGNETIC DAMAGE TO A GMR HEAD DURING BACK-END PROCESSING

BACKGROUND OF THE INVENTION

1. Field of the Invention

This invention relates generally to "back-end" processing of GMR read heads, including the processing of assemblies containing GMR read heads, and particularly to a method of preventing damage to the transverse biasing of the GMR read heads by process induced stresses and by external magnetic fields that may be present during such processing.

2. Description of the Related Art

GMR (giant magneto-resistive) and MR (magneto-resistive) heads and slider assemblies are formed on wafers in arrays of complete, already magnetized units, which must then be subjected to additional, so-called "back-end" process steps, such as separation of the array into individual units and lapping each unit to an acceptable degree of smoothness. An example of how at least a substantial portion of such "back-end" processing proceeds is provided by Sasaki et at. (U.S. Pat. No. 6,374,479), who teach a method of slicing the wafer into rows of slider sections and of bonding the sliced sections to a supporting plate for further processing.

The heads, themselves, are small and delicate and subject to various types of damage during the back-end processing steps. The industry has been particularly concerned with damage to the heads caused by electrostatic discharges (ESD) that can occur during the processing. In this regard, Girard et al. (U.S. Pat. No. 6,146,813) teach a method of forming (and removing) shunts between portions of electrical components (including GMR heads), said shunts providing a mechanism for safely dissipating induced currents and electrostatically deposited charges. Han et al. (U.S. Pat. No. 6,415,500) teaches a method of avoiding ESD by connecting the sensor to its shields during the back-end processing steps in such a way that there is an equal electrical potential between the sensor and its shields during the duration of the process.

Another concern during back-end processing is that the lapping process can proceed beyond the desired limits and damage the active surfaces of the GMR head. Zhu (U.S. Pat. No. 6,230,389) teaches the formation of a lapping monitor, which is an additional, sacrificial portion of the sensor layer whose changing shape during lapping allows the progress of the lapping to be accurately followed.

None of the methods discussed above address the problem of possible adverse affects of back-end processing to the magnetic properties of the GMR head. Even before the beginning of back-end processing, the magnetic properties of GMR layers have been established by annealing in the presence of appropriate magnetic fields. Magnetic biasing is of particular importance to the performance of a GMR head and two types of biasing are established prior to back-end processing: longitudinal and transverse. Longitudinal biasing, typically provided by adjacent permanent magnetic layers formed with the conducting lead layers, stabilizes the domain structure and magnetic moment direction of a GMR head's free layer. Transverse biasing, typically provided by a antiferromagnetically pinned layer formed within the GMR sensor, provides a reference direction with respect to which the magnetic moment of the free layer moves. Both of these biasing structures are already established during the wafer formation prior to back-end processing.

In back-end processing, the lapping process produces stresses and even plastic deformations within the wafer as an unavoidable part of stock removal. These stresses cause both biases to change, particularly when combined with other disturbances such as stray magnetic fields, elevated temperatures and ESD induced currents. As a result, the final GMR product can have its biases altered in a random and uncontrollable fashion, adversely affecting product yields. While the longitudinal bias can be restored to its pre-processing state with relative ease, restoration of the transverse bias cannot be accomplished economically either during or after the processing. Prior art methodology, as noted above, has concentrated on prevention of ESD events during processing. The present invention teaches an entirely new method for controlling damage to biasing during back-end processing and, by so doing, will improve product yields substantially.

SUMMARY OF THE INVENTION

Accordingly, it is a first object of this invention to provide a method of improving GMR (and, generally, MR) product yields by restoring magnetic biasing during and subsequent to back-end processing to within specifications established prior to back-end processing.

It is a second object of the present invention to provide a novel fixture to support GMR assemblies during back-end processes such as row and slider manufacturing operations including lapping, which fixture enables the use of external magnetic fields to stabilize the transverse biasing in said assemblies.

The objects stated above will be achieved by applying the proper magnetic field to the GMR head (or other assembly, generically called the "workpiece" hereinafter) during back-end processing. The field can be provided by permanent or electromagnets which can be external to the workpiece and mounted in a fixture as discussed below, or incorporated within the head structure itself. The magnitude and direction of the field is such that the desired (ie., pre-processing) state of transverse bias is a state of minimum potential energy. More specifically, the direction of the field should be parallel to the desired exchange field provided by the antiferromagnetic (AFM) pinning layer which pins the transverse biasing layer. This field will hereinafter be referred to as the "stabilizing field." Because the AFM structure is situated in a state of minimum potential energy, it can resist disturbances such as mechanical stress, electrical shock, temperature elevation and stray magnetic fields. Consequently, the transverse bias of the GMR structure is less likely to change.

At least a part of the stabilizing field can be supplied by the permanent magnets which are used to provide longitudinal bias. Although these magnets are intended to provide the necessary longitudinal fields, they can be initially magnetized so as to stabilize the transverse bias and then restored to their intended longitudinal direction after back-end processing is complete. Specifically, this requires the permanent magnets to be initially oriented so that they oppose the exchange field of the AFM layer. In this orientation, the external stabilizing field is parallel with the exchange field. Subsequent to the back-end process, the longitudinal bias is set back to its proper value and direction using, for example, a process such as the following: 1) subject the workpiece to a longitudinal magnetic field of approximately 5000 Oe, for a predetermined time such as approximately 10 seconds; 2) then, subject the workpiece to a decreasing, alternating transverse magnetic field, varying in magnitude from 500 Oe to 100 Oe. In this process, the imposed longitudinal field restores the longitudinal bias, but hysteresis effects will prevent the transverse biasing field from attaining its most stable state. The oscillating, alternating transverse field allows this stable final state to be attained. The limiting values of the oscillating field (ie., 500 Oe and 100 Oe) are chosen so that the higher value will not damage the re-set longitudinal bias and so that the lower value is comparable to the largest field that a GMR head would experience during normal operating conditions.

Although a substantial portion of, even the entire, stabilization field may be provided by the longitudinal biasing magnets, stabilization may also be advantageously provided by external magnets forming part of a novel fixture which simultaneously holds the workpiece and stabilizes its transverse bias. The design of such a fixture and the effects of its imposed magnetic fields will be further discussed and described below under the description of the preferred embodiments.

DESCRIPTION OF THE PREFERRED EMBODIMENTS

The preferred embodiments of the present invention each provide a method for preserving the desired transverse biasing of an MR or GMR read head during back-end processing of the read head. In a first preferred embodiment, the transverse biasing field is stabilized by applying an additional, stabilizing field to the read head which results in the biasing layer being in a region of minimum potential energy when the biasing field is properly oriented in a transverse direction. In this embodiment, the stabilizing field is internally provided, by the longitudinal biasing permanent magnetic layer of the read head. This necessitates the field of the longitudinal biasing being re-oriented in a transverse direction prior to processing and is being re-set to the required longitudinal direction when the processing steps are completed. The re-setting process is achieved by first placing the read head in a strong longitudinal field for a brief time period, following which it is placed in a decreasing, oscillating transverse field, to insure stability of the longitudinal biasing layers.

In a second preferred embodiment, the stabilizing field is externally supplied by affixing the read head (or whatever workpiece contains the read head) to a fixture that incorporates a magnetic portion. The fixture simultaneously holds the workpiece for the processing steps (eg. lapping), while providing the magnetic field necessary to maintain the proper transverse bias direction. The magnetic portion of the fixture may be configured in at least two ways: 1) directly between the body of the fixture (which may be of soft magnetic material or may be non-magnetic) and the workpiece, or, 2) alongside the workpiece, but not in contact with it. In either configuration (and others may be envisioned) the magnetic portion provides the necessary magnetic field.

It is to be recognized that the methods of each embodiment may be used by themselves or in combination. For example, if the desired stabilization of the biasing can be obtained using only the field of the longitudinal biasing layer, the workpiece may be mounted on a standard fixture of the prior art. If additional stabilization is required, the workpiece may be mounted on the fixture of the second preferred embodiment and, in addition, the longitudinal biasing layer may be transversely oriented to provide additional stabilization.

First Preferred Embodiment

Figure 1A:
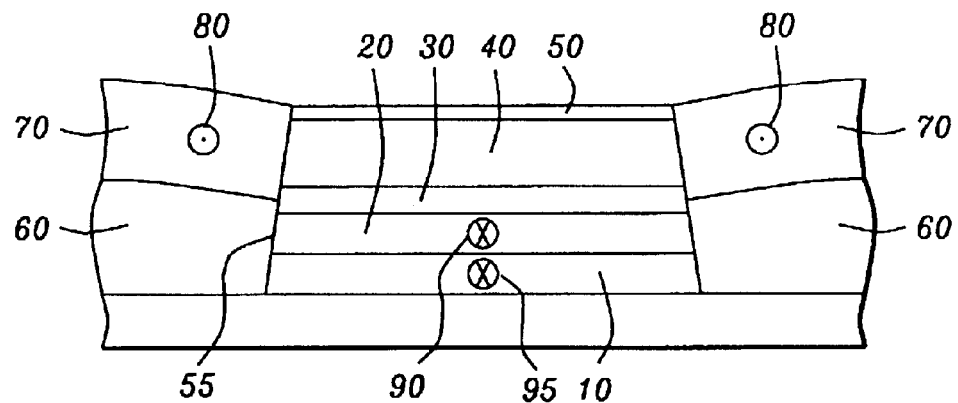
FIG. 1a is a schematic diagram of a prior art GMR read head showing the re-oriented directions of the longitudinal biasing layers required to stabilize the transverse bias of a GMR (or MR) read head during back-end processing in accord with a first preferred embodiment of the invention.

Referring first to FIG. 1a, there is shown a schematic cross-sectional view of the layer structure of a typical prior-art type GMR read head in the plane of its air-bearing surface (ABS). There is shown the antiferromagnetic (AFM) pinning layer (10), the transverse biasing layer that is the ferromagnetic pinned layer (20) formed on the AFM layer and pinned by the AFM layer, a non-magnetic spacer layer (30) formed on the pinned layer, the ferromagnetic free layer (40) formed on the spacer layer and a capping layer (50). The lateral edges (55) of the layers are shaped so that conducting lead layers (60) and longitudinal biasing layers (70) can be can be deposited and abutted against them as shown in the figure. The figure is both schematic and exemplary. Other configurations of MR and GMR read heads, such as those having laminated free and/or pinned layers, can be equally well treated with the method to be described.

The diagram also shows the novel magnetization direction of both of the longitudinal biasing layers, which is directed transversely to the cross-sectional plane, as shown by the outward directed arrow (dot in circle (80)). In the prior art, the magnetization would be directed longitudinally, in the plane of the cross-section and parallel to the free layer (40), at this stage of the processing. In the present method, the magnetization of the longitudinal biasing layers is set opposite to (antiparallel to) the magnetization of the pinned layer, which is shown as an arrow directed into the plane of the cross-section (90). There is also shown the magnetization direction of the AFM layer (95), which exchange couples to that of the pinned layer.

At this time, the read head, which would typically be part of a more complex workpiece, will be subject to processing steps that could, in the methods of the prior art, adversely affect the magnetization (90) of the pinned layer. In the present method, however, the combination of the magnetization of the biasing layers (80) and of the pinning layer (95), places the pinned layer in a potential energy minimum when its magnetization is transversely directed as required. This energetically favorable condition makes it much more unlikely that the magnetization of the pinned layer will change during processing. It is noted that the transverse fields of the longitudinal biasing layers may be inadequate to provide the necessary stabilization of the transverse biasing under certain processing steps or given size restrictions on the biasing layers themselves. In this case, additional, external magnets may be required to augment the fields provided by the internal magnets which are the longitudinal biasing layers.

Figure 1B:
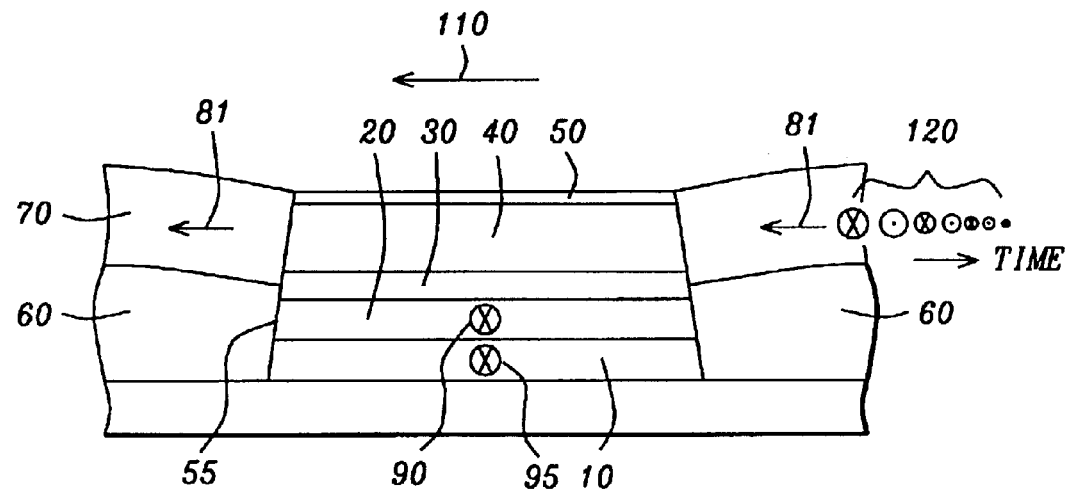
FIG. 1b is a schematic diagram of the read head of FIG. 1a, showing the longitudinal re-setting field for the longitudinal biasing layers and the decreasing transverse oscillating field for stabilizing the longitudinal biasing layers.

Referring next to FIG. 1b, there is shown the method by which, when processing is completed, the transverse magnetization of the biasing layers is reset to their required longitudinal direction. As can be seen by the arrow (110), there is first the imposition of a longitudinal magnetic field of approximately 5000 Oe for a predetermined duration of, for example 10 seconds which resets the longitudinal bias (81). Such a re-setting process is known in the prior art and is not elaborated on further. What is novel in the present method, however, is the imposition of an additional, oscillating, transverse field, as shown pictorially (120) by a series of diminishing circles, symbolizing a magnetic field oscillating into and out of the transverse plane, whose magnitude decreases from approximately 500 Oe to about 100 Oe, preferably in 10 uniform cycles of reversal and reduction. The oscillating field simulates transversal fields the read head will encounter in actual operation, such as in a disk drive. Typically transverse fields produced by data stored in the disk drive and impinging on the read head is on the order of 100 Oe. However, transverse fields produced by features of longer wavelength, such as the servo bursts, can be several times greater. Furthermore, the fly height of the read head fluctuates during its operation. Transverse fields at the read head become stronger when the fly height is reduced. Combining both the wavelength and the fly height extremes, the read head may encounter transverse field strengths up to 500 Oe. in a simplified model, 500 Oe is low enough so that neither the pinned layer nor the longitudinal bias layers will be affected. However, the field may be amplified at the extremeties of the magnetic components, such as the pinned layer and the longitudinal bias layers. Furthermore, the propensity of the magnetic state to change depends on the history of the external fields to which it has been subjected. Immediately after the longitudinal bias reset, both the longitudinal bias layers and the pinned layer may change as a result of only a few hundred Oe of transverse field, although change in the longitudinal bias layers is dominant. Change in any magnetic component causes the performance of the read head to change. In order to prevent unpredictable changes in a final product, a sequence of successively decreasing alternating transverse fields is applied to the read head prior to its final testing. The larger 500 Oe magnitude is chosen so as to minimize unwanted changes in the already achieved re-setting of the longitudinal bias direction, while surpassing foreseeable transverse fields encountered during actual operation. The lower 100 Oe magnitude is chosen because it represents the typical field that the read head would experience during actual operation.

Second Preferred Embodiment

Figure 2:
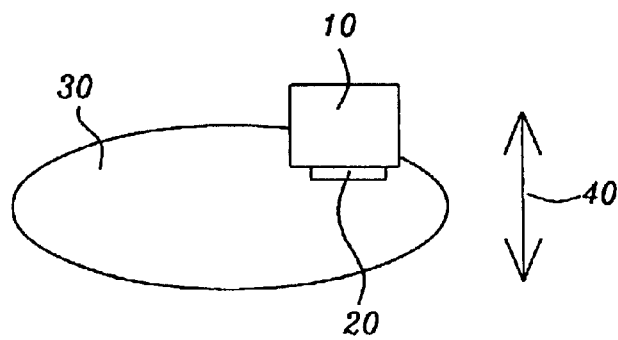
FIG. 2 is a schematic diagram showing a workpiece being lapped while supported by the field-stabilizing fixture of the second preferred embodiment of the present invention.

Referring now to FIG. 2, there is shown a schematic diagram of the fixture of the second preferred embodiment (10) holding a secured workpiece (20) against a lapping plate (30). The workpiece is typically a "row bar", ie., a section of wafer containing multiple GMR head assemblies. The stabilizing magnetic field is shown as a double headed arrow (40), indicating its direction and two possible senses. It is to be noted that the fixture may be used in a lapping process or it may be used in other processes in which a workpiece is to be securely mounted during processing.

Figure 3:
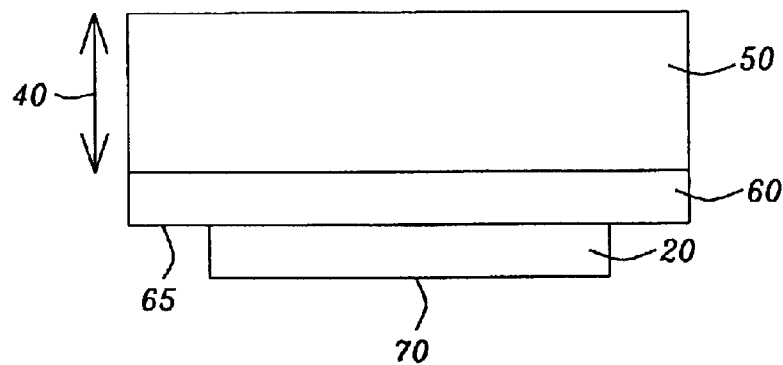
FIG. 3 is a more detailed schematic diagram of the second embodiment, showing the body of the fixture, the magnetic portion of the fixture, a supported workpiece affixed to the magnetic portion and the magnetic field produced by the magnetic portion.

Referring next to FIG. 3, there is shown a somewhat more detailed schematic illustration of the fixture ((10) of FIG. 2), showing that the fixture comprises a first portion, which is a non-magnetic or soft magnetic portion (50), to which is attached a second portion, which is a magnetic portion (60), which can be a permanent magnet (hard magnetic material) or an electromagnet. A ceramic magnetic material, primarily composed of iron oxide and barium/strontium carbonate, is preferred for its low cost and corrosion resistance. Preferred non-magnetic materials include non-magnetic stainless steel (e.g. type 303 stainless steel) and ceramic materials. The workpiece (20) is secured to a bottom surface (65) (the surface closest to the lapping plate in this example) of the magnetic portion and the lapping surface (70) of the workpiece is indicated for clarity. Once again, the double ended arrow (40) indicates the stabilizing field provided by the magnetic portion (60) of the fixture.

Figure 4:
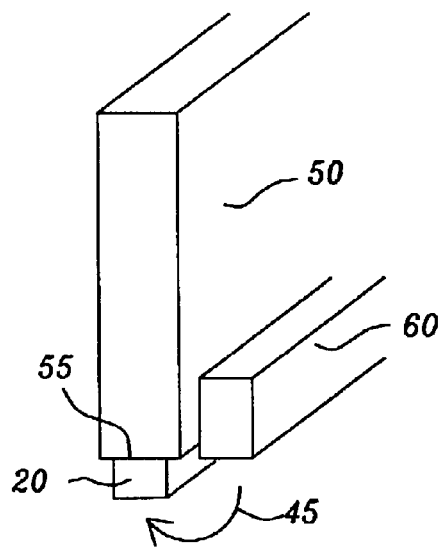
FIG. 4 shows an alternative second preferred embodiment of the fixture, in which the magnetic portion is located adjacent to the fixture body and does not physically contact the workpiece.

Referring next to FIG. 4, there is shown, in perspective, an alternative configuration of the fixture in FIGS. 2 and 3, wherein the magnetic portion (60) is now affixed to a side of the non-magnetic portion of the fixture (50) and the workpiece (20) is attached to the bottom surface (55) of the non-magnetic portion. The curved arrow (45) shows the field direction (flux path) of the stabilizing field in this configuration.

In either the configuration of FIGS. 2 and 3, or the configuration of FIG. 4, the novel feature of the invention is the stabilizing magnetic field which maintains the field direction of the transverse pinned layer of the GMR read heads contained in the workpiece. The magnetic field produced by the magnetic portion of the fixture in either configuration should be approximately 200 Oe or greater (ie., it should exceed 200 Oe) as measured at the pinned layers of the GMR heads within the workpiece.

Figure 5:
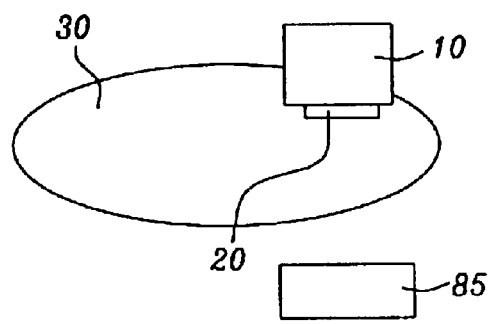
FIG. 5 shows yet another alternative to the second embodiment in which an additional magnet is fixed to the lapping machine, beneath the lapping plate, rather than being attached to the fixture.

Referring finally to FIG. 5, there is shown yet another alternative to using the magnetized fixture by itself. In this alternative, an additional magnet is positioned on or at the lapping machine (of FIG. 2) itself. In the figure, only an isolated single magnet is shown beneath the lapping plate (85), but more than one magnet can be similarly positioned to augment the field of the fixture. Indeed, such magnets could replace the magnetic portion of the fixture entirely. All other elements of the figure are the same as those in FIGS. 2, 3 and 4, in that the fixture may still be magnetized.

As is understood by a person skilled in the art, the preferred embodiments of the present invention are illustrative of the present invention rather than limiting of the present invention. Revisions and modifications may be made to methods, materials, structures and dimensions employed in providing a method for preserving the transverse biasing of an MR or GMR read head during back-end processing of the read head, while still providing such a a method for preserving the transverse biasing of an MR or GMR read head during back-end processing of the read head as described herein, in accord with the spirit and scope of the present invention as defined by the appended claims.

What is claimed is:

1. A method for preserving a transverse biasing of a read head during back-end processing of a workpiece which includes said read head, comprising:

providing the workpiece to be processed, said workpiece including the transversely biased read head, and said read head also including longitudinal biasing layers;

magnetizing said longitudinal biasing layers in a transverse direction;

processing said workpiece;

re-setting the magnetization of said longitudinal biasing layers in a longitudinal direction by placing said read head in an appropriate external longitudinal magnetic field.

2. The method of claim 1 wherein the transverse biasing is provided by a pinned transverse biasing layer whose magnetization is pinned in a transverse direction by an exchange coupling with an antiferromagnetic pinning layer.

3. The method of claim 2 wherein the transverse magnetization of the longitudinal biasing layers, when combined with the exchange coupling of the pinning layer, stabilizes the transverse magnetization of the transverse biasing pinned layer by placing said transverse biasing pinned layer in a position of minimum magnetic potential energy when said pinned layer is magnetized in a transverse direction.

4. The method of claim 3 wherein the direction of the transverse magnetization of the longitudinal biasing layers is anti-parallel to the exchange coupling field of said antiferromagnetic layer.

5. The method of claim 4 wherein the longitudinal magnetization of the longitudinal biasing layers is re-set by placing said read head in a longitudinal magnetic field of approximately 5000 Oe for a period of approximately 10 seconds.

6. The method of claim 1 further including the elimination of residual effects of said re-setting on the transverse biasing of said read head and the establishing of a stable transverse biasing of said read head by subjecting said read head to an oscillating transverse magnetic field that decreases in magnitude from a high value to a low value.

7. The method of claim 6 wherein the high and low values of the magnitude of the oscillating transverse magnetic field are chosen, respectively, so as not to adversely affect the already re-set longitudinal biasing magnetization and so to approximate the magnetic fields at the sensor during operating conditions 8. The method of claim 7 wherein the high and low values of the magnitude of the oscillating transverse magnetic field are, respectively, approximately 500 Oe and 100 Oe.

9. The method of claim 8 wherein the oscillating transverse magnetic field is uniformly reduced from a magnitude of approximately 500 Oe to a magnitude of approximately 100 Oe in 10 cycles of oscillation.

10. The method of claim 1 further comprising an imposition of additional transverse magnetic fields to augment the fields of the longitudinal biasing layers.

* * * * *